United States Patent [19]

Goldberg et al.

[11] Patent Number: 4,600,441

[45] Date of Patent: Jul. 15, 1986

[54] OIL AND DIRT REPELLENT ALKYD PAINT

[75] Inventors: Newton N. Goldberg, Penn Hills Township, Allegheny County; John S. Hudock, Hempfield Township, Mercer County, both of Pa.

[73] Assignee: Westinghouse Electric Corp., Pittsburgh, Pa.

[21] Appl. No.: 714,608

[22] Filed: Mar. 21, 1985

[51] Int. Cl.$^4$ .......................... C09D 3/26; C09D 7/00
[52] U.S. Cl. ..................................... 106/253; 106/243; 106/244; 106/311; 526/245; 528/272; 528/274; 528/299; 528/401; 568/842
[58] Field of Search ............... 106/243, 244, 253, 311; 526/245; 528/272, 274, 299, 401; 568/842

[56] References Cited

U.S. PATENT DOCUMENTS

| | | | |
|---|---|---|---|
| 3,171,861 | 3/1965 | Ahlbrecht | 528/401 |
| 3,504,016 | 3/1970 | Smeltz | 560/80 |
| 3,818,074 | 6/1974 | Ahlbrecht | 568/842 |
| 3,822,228 | 7/1974 | Petrella et al. | 526/245 |
| 4,116,904 | 9/1978 | Verma | 106/253 |
| 4,131,579 | 12/1978 | Mummenthey et al. | 106/252 |
| 4,299,742 | 11/1981 | Belder et al. | 106/253 |
| 4,365,049 | 12/1982 | Tsunoda et al. | 526/245 |

OTHER PUBLICATIONS

*Modern Paint and Coatings*, "Fluorinated Polyurethanes Provide Superior Weather Protection", Jun. 1982, pp. 56–57.

*Primary Examiner*—Paul Lieberman
*Assistant Examiner*—Robert A. Wax
*Attorney, Agent, or Firm*—Daniel P. Cillo

[57] ABSTRACT

An air-drying, oil and dirt repellent alkyd paint is made by reacting a drying component, such as a drying oil, hydroxyl containing mixture of fluorine-free polyol and fluorinated aliphatic alcohol having a perfluoroalkyl group of from 4 to 12 carbon atoms, and a polycarboxylic acid, and then adding a suitable solvent, and a pigment component.

6 Claims, No Drawings

OIL AND DIRT REPELLENT ALKYD PAINT

BACKGROUND OF THE INVENTION

Alkyd (polyester) paints are well known in the art, and are taught, for example, by Belder et al., in U.S. Pat. No. 4,299,742. These alkyd paints can contain, for example: (1) 45 wt. % to 85 wt. % of a drying oil component, such as tung oil, linseed oil, soybean oil, castor oil, or the like, or an unsaturated fatty acid component, such as linoleic fatty acid, tall oil fatty acid, or the like, (2) 10 wt. % to 30 wt. % of a polyol such as propylene glycol, trimethylol propane, pentaerythritol, or the like, (3) 10 wt. % to 25 wt. % of a polycarboxylic acid, such as phthalic acid or anhydride, maleic acid or anhydride, or the like, (4) alkylene oxide, if a water-based paint is desired, and (5) suitable emulsifying agents and solvents.

The oil and polyol are usually mixed and heated to about 250° C. to complete alcoholysis, cooled to about 200° C., and then mixed with the acid and any alkylene oxide used, after which azeotropic distillation is carried out to a selected acid value and viscosity in solvent, to provide a paint vehicle product. To 100 parts of this solvent and paint vehicle reaction product, about 15 parts to about 60 parts by weight of pigment component, such as zinc oxide, titanium dioxide, or the like, is added, to provide the desired paint color. The pigment component can be added as a paste, containing, for example, pigment, wetting agent, drier, solvent, anti-skinning agent, and thickening agent.

These alkyd based paints are of value because of their comparatively low cost, durability, flexibility, gloss retention, and reasonable heat resistance. While these properties are desirable, paints having improved oil and dirt repellency would be especially useful in almost all paint applications, providing the cost and other advantages of the alkyd based paints could be retained.

One attempt to provide easily cleanable paints was described in *Modern Paint and Coatings,* "Fluorinated Polyurethanes Provide Superior Weather Protection", June 1982, pp. 56-57, where it was reported that the Naval Research Laboratory used a paint based on a fluorinated polyurethane, containing powdered Teflon, as an antifouling marine hull paint to cope with the fouling of ships' hulls by barnacles and other marine organisms. Such paints were described as a high cost surface coating.

In other areas, fluorine containing compounds have been used to make organic, fibrous materials that are oil and water resistant. Ahlbrecht, in U.S. Pat. No. 3,171,861, teaches fluorinated aliphatic alcohols containing perfluoroalkyl groups with 3 to 12 carbon atoms as intermediates in the preparation of: perfluoroalkyl-substituted triazines, which when reacted with formaldehyde yield compounds useful as thermosetting resins exhibiting oil and water repellent characteristics; perfluoroalkyl acrylates, useful as oil and water repellent coatings for fabric or paper; and perfluoroalkyl halomethyl ethers and their quaternary amine salts, useful as soil resistant coatings for textiles, paper, leather and wood. Smeltz, in U.S. Pat. No. 3,504,016, teaches fluorinated polyesters, useful as oil and water repellent fabric coatings, where the polyesters are prepared from a perfluoroalkyl-terminated, alkyl-1,3-propane diol, and a dibasic acid, such as malonic acid, succinic acid, phthalic acid, terephthalic acid, or the like, with optional addition of a nonhalogenated diol, such as ethylene glycol; tetraethylene glycol; 1,4-cyclohexanediol, or the like.

SUMMARY OF THE INVENTION

The need for air-dryable, low cost, oil and dirt repellent alkyd paint has been met by utilizing a combination of 70 wt. % to 98 wt. % fluorine-free polyol and 2 wt. % to 30 wt. % of a fluorinated aliphatic alcohol, having a perfluoroalkyl group of from 4 to 12 carbon atoms as the alcohol component, in an alkyd paint vehicle formulation, where the term "polyol" is used throughout to mean a compound having two or more hydroxyl groups. Thus, the solution of alkyd vehicle of this invention would contain: (1) about 20 wt. % to about 85 wt. % of a driving component, such as drying oil, (2) about 10 wt. % to about 35 wt. % of hydroxyl component mixture containing from 70 wt. % to 98 wt. % fluorine-free polyol and from 2 wt. % to 30 wt. % of a fluorinated aliphatic alcohol having a perfluoroalkyl group of from 4 to 12 carbon atoms, and (3) about 10 wt. % to about 50 wt. % of a polycarboxylic acid, with an appropriate amount of a suitable solvent. To 100 parts of this solvent solution of the alkyd paint vehicle reaction product component, can be added about 15 parts to about 60 parts of a suitable coloring pigment component. This provides a low cost alkyd paint having good air drying properties, excellent oil and dirt repellency, and outstanding durability, gloss retention and heat and water resistance. These paints are particularly useful on engines, motors, and the like, which may operate in a dirt and oil environment.

DESCRIPTION OF THE PREFERRED EMBODIMENTS

The air-dryable alkyd paint of this invention is a reacted admixture containing: (1) a drying component, such as a drying oil, (2) hydroxyl component mixture of fluorine-free polyol having two or more hydroxyl groups, and fluorinated aliphatic alcohol having a perfluoroalkyl group of from 4 to 12 carbon atoms, and (3) polycarboxylic acid, with suitable emulsifying agent and solvent added to provide an alkyd paint vehicle composition. To this solvent solution of alkyd paint vehicle, suitable pigment is added.

Useful drying oils can include any of the common drying or semi-drying types, and can include tung oil, linseed oil, perilla oil, oiticica oil, menhaden oil, safflower oil, and the like, and preferably soybean oil or dehydrated castor oil, and their mixtures.

Useful fluorine-free polyols can include: (1) diols, such as neopentyl glycol; ethylene glycol; propylene glycol; 1,3-propane diol; 1,4-butane diol; 1,2-butane diol, and the like, and their mixtures, and (2) triols, such as tris (2 hydroxy alkyl) isocyanurate, where alkyl is preferably ethyl; glycerine; pentaerythritol; inositol; tri methylol propane; tri methylol ethane; sorbitol, and the like, and their mixtures.

Useful fluorinated aliphatic alcohols are monohydric alcohols having a perfluoroalkyl group of from 4 to 12 carbon atoms. These fluorinated aliphatic monohydric alcohols can have the structural formula:

$$F(CF_2)_n-(CH_2)_m-OH,$$

where n is an integer from 4 to 12 and m is an integer from about 2 to about 12, and where $F(CF_2)_n-$ is the perfluoroalkyl group. In the preferred fluorinated aliphatic alcohols n is an integer from 6 to 10 and m is an integer from about 2 to about 4. The inclusion of this particular class of fluorinated aliphatic alcohols is critical in providing oil and dirt repellency to the alkyd paint. In this invention a mixture of fluorine-free polyol and fluorinated aliphatic alcohols is essential.

Useful polycarboxylic acids can include: (1) aromatic dicarboxylic acids, such as phthalic acid; terephthalic acid; isophthalic acid; and their mixtures, (2) cycloaliphatic dicarboxylic acids, such as tetrahydrophthalic acid, (3) tricarboxylic acids, such as trimellitic anhydride, (4) unsaturated aliphatic dicarboxylic acids, such as maleic acid; fumaric acid; and their mixtures, and (5) saturated aliphatic dicarboxylic acids, such as succinic acid; glutaric acid; adipic acid; pimelic acid; sebacic acid; azelaic acid; suberic acid, and the like, and their mixtures, or mixtures of these acid types. In all cases where applicable, the acid anhydride form can be used in place of the acid form, and as used herein, the term "carboxylic acid" is meant to include carboxylic acid anhydrides.

Suitable solvents include xylene; toluene; and other aromatic solvents, glycol ethers; and ketones, such as methyl isobutyl ketone, and the like, alone or in combination. If a water base paint is desired, a polyalkylene oxide having a number of $C_2$–$C_4$ alkylene oxide units attached to a $C_1$–$C_6$ mono- or poly-hydroxy compound can be used as a solvent, for example, polyethylene glycol. A wide variety of non-ionic or anionic emulsifiers, driers, extenders, pH adjustors, and the like, well known in the resin and paint art, can also be added in small effective amounts.

The useful weight percent range of the various alkyd paint vehicle components is: (1) about 20 wt. % to about 85 wt. % preferably 20 wt. % to 40 wt. % of a drying component, such as a drying oil, (2) about 10 wt. % to about 35 wt. %, preferably 15 wt. % to about 30 wt. % of hydroxyl component mixture containing from 70 wt. % to 98 wt. % fluorine-free polyol and from 2 wt. % to 30 wt. % of a fluorinated aliphatic alcohol having a perfluoroalkyl group of from 4 to 12 carbon atoms, and (3) about 10 wt. % to about 50 wt. % preferably 30 wt. % to 50 wt. % of a polycarboxylic acid. Under 2 wt. % fluorinated alcohol, little oil repellent effect occurs. Over 30 wt. %, vehicle polymerization would be inhibited. To these ingredients is added an appropriate amount of suitable solvent, effective to provide a solids content of from about 40 wt. % to about 70 wt. % for the alkyd resin of the paint vehicle.

Useful pigments that can be added to the paint vehicle include zinc oxide, titanium dioxide, zinc sulfide, calcium sulfate, zirconium oxide, antimony oxide, iron oxide, ochre, sienna, toluidine red, chrome yellow, zinc yellow, blue lead, chromium oxide green, and the like, as are well known in the paint art. The pigment can be added to the paint vehicle as a paste, containing, for example, pigment, wetting agent, drier, solvent, antiskinning and thickening agent. Useful wetting agents may include butyl stearate, amyl stearate, oleic acid, glycol esters and the like, and useful driers include cobalt naphthenate and the like, as are well known in the paint art. The useful ratio of pigment component is from about 15 parts to about 60 parts per 100 parts of the solvent solution of the paint vehicle reaction product component.

Usually the drying component oil or unsaturated fatty acid is heated to about 200° C. A small amount of an alkali hydroxide is added to effect alcoholysis, the temperature is raised to about 225° C., the hydroxyl containing mixture is added, and the mixture heated until alcoholysis are completed. The mixture is cooled to about 190° C. and the acid and reflux solvent is added, after which aceotropic distillation is carried out to an acid value of from about 11 to about 12 and a selected viscosity. The reacted paint vehicle is then cooled, cut with additional solvent, and admixed with the pigment component, to provide an air-dryable alkyd paint having outstanding oil and dirt repellency.

EXAMPLE 1

A reaction kettle is set for straight reflux. It is then charged with 1.39 pounds of soya oil and 209.8 pounds of dehydrated castor oil, totaling 28.22 wt. % of the active vehicle components. The kettle is heated to 200° C. after which 0.6 pound of calcium hydroxide is added. The kettle temperature is then increased to 225° C. At this point 191.64 pounds of pentaerythritol (fluorine-free triol) and 16.67 pounds of fluorinated aliphatic monohydric alcohol having the structural formula $F(CF_2)_nCH_2CH_2OH$, where n ranges from 4 to 12 with an average value of 8, having a fluorine content of about 69.6% (sold commercially by DuPont under the Tradename Zonyl BA) is added. The total hydroxyl containing component constitutes 27.82 wt. % of the active vehicle components, with the fluorinated aliphatic alcohol constituting 7.9 wt. % of the hydroxyl containing component.

The kettle reaction is then continued until alcoholysis is completed as indicated by a clear solution when 1 part of the reaction mixture was added to 3 parts of ethanol. The kettle is cooled to 190° C. and then 328.9 pounds of phthalic anhydride, 43.94 wt. % of the active vehicle component is added. Additionally, 135.3 pounds of xylol is added and the reaction changed to azeotropic distillation. The kettle is heated to 220° C. and held until an acid value of 11 to 12 is reached and the viscosity is approximately Gardner "H" at 60% solids in xylol. After cooling to 25° C., an additional 1184.3 pounds of xylol solvent is added to provide a paint vehicle of about 60 wt. % solids content.

Finally, to 100 parts by weight of the paint vehicle, 40 parts of titanium dioxide pigment is added, to provide a paint having a white color. This paint can be coated onto steel panels and other substrates to a thickness of about 0.001 inch and allowed to air dry for up to 16 hours, to provide an oil and dirt repellent paint.

We claim:
1. An air-drying alkyd paint consisting essentially of:
(A) 100 parts by weight of a solvent solution of an alkyd paint vehicle reaction product component consisting essentially of:
  (1) about 20 wt. % to about 85 wt. % of a drying component;
  (2) about 10 wt. % to about 35 wt. % of a hydroxyl component consisting essentially of:
    (a) 70 wt. % to 98 wt. % of a fluorine-free polyol, and
    (b) 2 wt. % to 30 wt. % of a fluorinated aliphatic monohydric alcohol having the structural formula $F(CF_2)_n$—$(CH_2)_m$—$OH$, where n is an integer from 4 to 12 and m is an integer from about 2 to about 12,
  (3) about 10 wt. % to about 50 wt. % of a polycarboxylic acid; and
(B) about 15 parts by weight to about 60 parts by weight of a coloring pigment component.

2. The alkyd paint of claim 1, where the drying component is a drying oil.

3. The alkyd paint of claim 1, where the fluorine-free polyol is a triol, and the polycarboxylic acid is an aromatic dicarboxylic acid.

4. The alkyd paint of claim 1, where, in the structural formula n is an integer from 6 to 10 and m is an integer from about 2 to about 4.

5. The alkyd paint of claim 1, where the drying component contains dehydrated castor oil, the fluorine-free polyol is pentaerythritol and the polycarboxylic acid is phthalic acid.

6. The alkyd paint of claim 1, where the fluorinated aliphatic alcohol is $F(CF_2)_nCH_2CH_2OH$, where n has an average value of 8.

* * * * *